US008055929B2

(12) United States Patent
Froehlich et al.

(10) Patent No.: US 8,055,929 B2
(45) Date of Patent: Nov. 8, 2011

(54) METHOD AND APPARATUS FOR MAINTAINING TIME IN A COMPUTER SYSTEM

(75) Inventors: Steven Froehlich, Danbury, CT (US); Michel H. T. Hack, Cortlandt Manor, NY (US); Xiaoqiao Meng, Mount Kisco, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 12/186,658

(22) Filed: Aug. 6, 2008

(65) Prior Publication Data

US 2010/0037081 A1 Feb. 11, 2010

(51) Int. Cl.
G06F 1/12 (2006.01)
G06F 1/00 (2006.01)
G06F 1/04 (2006.01)
G06F 1/14 (2006.01)

(52) U.S. Cl. ......... 713/400; 713/375; 713/500; 713/502

(58) Field of Classification Search ................... 713/375, 713/400, 500, 503, 600, 501–502
See application file for complete search history.

(56) References Cited

U.S. PATENT DOCUMENTS

| 6,957,357 B2 | 10/2005 | Liu et al. ........................ 713/503 |
| 7,103,514 B1 | 9/2006 | Carlson et al. ................. 702/189 |
| 7,194,649 B2 | 3/2007 | Liu et al. ........................ 713/400 |
| 2007/0058491 A1 | 3/2007 | Dahlen et al. .................... 368/46 |
| 2007/0061607 A1* | 3/2007 | Carlson et al. ................. 713/503 |
| 2007/0086489 A1 | 4/2007 | Carlson et al. ................. 370/516 |
| 2007/0086490 A1 | 4/2007 | Carlson et al. ................. 370/516 |
| 2008/0170592 A1 | 7/2008 | Hack et al. ..................... 370/503 |
| 2008/0270800 A1* | 10/2008 | Krober et al. .................. 713/178 |
| 2009/0190702 A1* | 7/2009 | Shaw et al. ..................... 375/355 |
| 2009/0290571 A1* | 11/2009 | Margolis ....................... 370/350 |

OTHER PUBLICATIONS

'circular buffer' in "The Free On-Line Dictionary of Computing". Online Jun. 17, 2000. Retrieved from Internet May 6, 2011. <http://foldoc.org/circular+buffer>.*
'International Atomic Tiime' in "The Free On-Line Dictionary of Computing". Online Apr. 2, 2001. Retrieved from Internet May 6, 2011. <http://foldoc.org/International+Atomic+Time>.*
'Coordinated Universal Tiime' in "The Free On-Line Dictionary of Computing". Online Aug. 30, 2001. Retrieved from Internet May 6, 2011. <http://foldoc.org/Coordinated+Universal+Time>.*
Kuhn, Markus G. "Leap-second considerations in distributed computer systems". ITU-R SRG 7A—Colloquium on the UTC timescale. Torino, May 28-29, 2003. pp. 1-25.*
Proposed New <time.H> for ISO C 200X, http://www.cl.cam.ac.uk/~mgk25/time/c/, pp. 1-17.

* cited by examiner

Primary Examiner — Thomas J Cleary
(74) Attorney, Agent, or Firm — Harrington & Smith

(57) ABSTRACT

A computer system is arranged with a circular buffer that includes a piecewise linear map from a high-resolution counter arranged to maintain International Atomic Time. The piecewise linear map includes a current leg that is currently being used and also a future leg that will be used in the future. The future leg is computed while the current leg is still being used.

20 Claims, 4 Drawing Sheets

METHOD AND APPARATUS FOR MAINTAINING TIME IN A COMPUTER SYSTEM

TECHNICAL FIELD

The present invention generally concerns methods and apparatus for maintaining time and more particularly a method and apparatus for maintaining international atomic time using a piecewise-linear mapping from a high-resolution counter.

BACKGROUND

In the field of computer systems there is a need to obtain the time of day ("TOD"). Unfortunately, the quality of the results in terms of accuracy and resolution is often less than optimum. Even when interpolation is used, as on recent versions of Linux there may be a significant short-term skew error. Furthermore, corrections may involve discontinuities or jumps. The way the high-resolution counter typically is used sometimes causes a sawtooth pattern when the system clock is compared to a smooth and accurate reference clock.

Many systems (other than IBM System Z) use system calls to obtain the TOD and the quality of the result in terms of accuracy and resolution is often not very good.

Even when interpolation is used, as on recent versions of Linux, there may be significant short-term skew error, and corrections may involve jumps.

The high-resolution counter typically used for interpolation could be used in a way that avoids inadequacies such as a saw tooth pattern when the system clock is compared to a smooth and accurate reference clock.

Other relevant background information can be found in the following patent documents:

"Clock filter dispersion", by Scott Carlson, Michel Hack and Li Zhang, filed 9 Sep. 2005 in the USPTO as application Ser. No. 11/223,878, assigned to IBM Corporation; and "Use of T4 timestamps to calculate clock offset and skew", by Scott Carlson, Michel Hack and Li Zhang, filed 9 Sep. 2005 in the USPTO as application Ser. No. 11/223,577, assigned to IBM Corporation.

SUMMARY OF THE INVENTION

Embodiments of the invention are directed to a method of accessing and maintaining time in computer systems with a high degree of accuracy, typically in the order of microseconds.

In a first aspect of the invention, a computer system is arranged with a processor arranged to provide a time of day, the processor including a circular buffer that includes a piecewise-linear map from a high-resolution counter arranged to maintain international atomic time (TAI).

The foregoing summary of the various embodiments of the present invention is exemplary and non-limiting. For example, one with ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Invention, when read in conjunction with the attached Drawing Figures, wherein.

DETAILED DESCRIPTION OF THE INVENTION

Briefly, a computer system is arranged with a circular buffer that includes a piecewise-linear map from a high-resolution counter arranged to maintain International Atomic Time. The piecewise-linear map includes a current leg that is currently being used and conceptually also a future leg that will be used in the future. As will be explained below, the current leg is in fact broken into a shorter current leg followed by a new leg that extends to "the end of time". The future leg is computed while the current leg is still being used.

Figure 1:
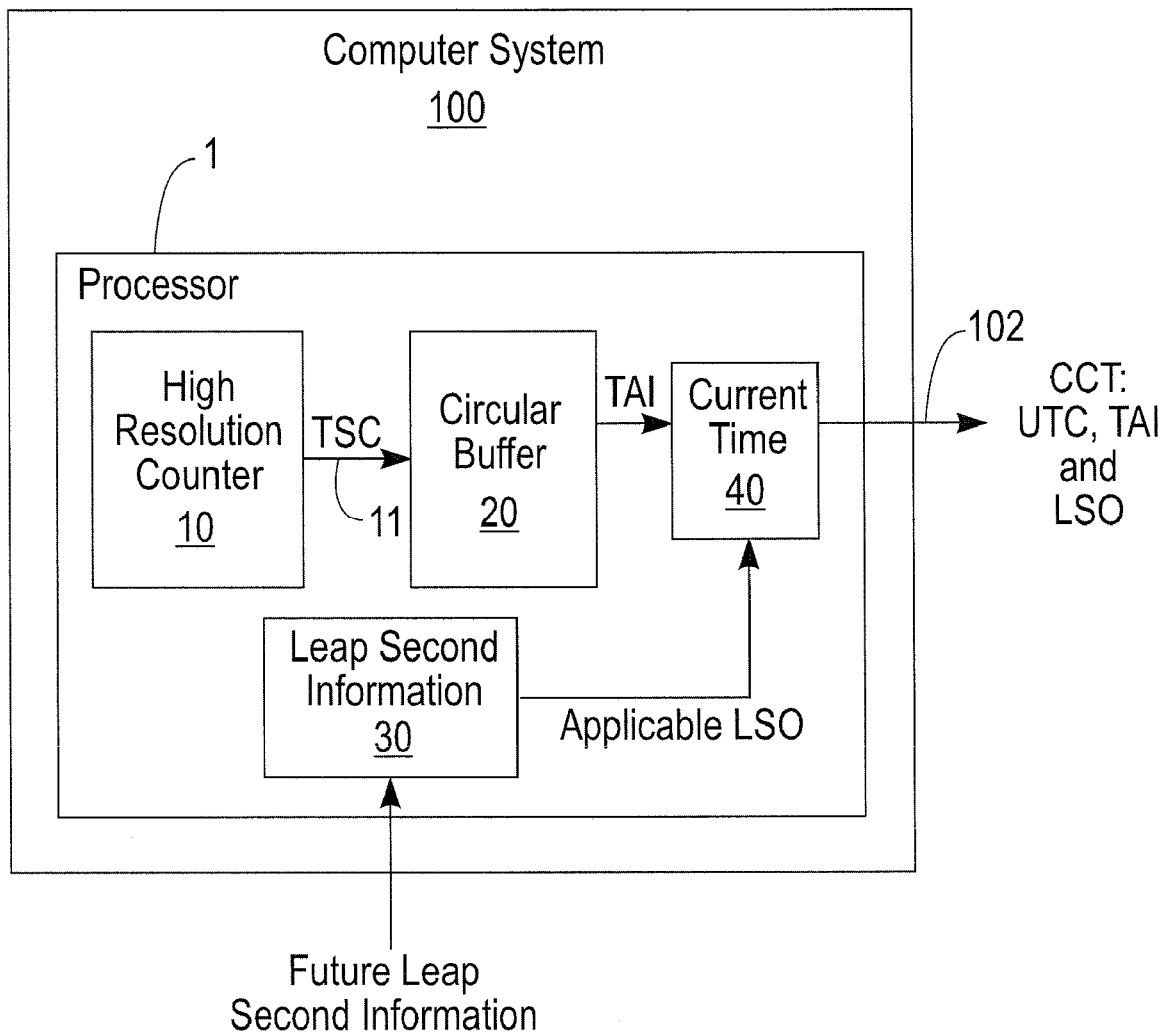
FIG. 1 is a block diagram depicting a computer system 100 including a processor 1, the processor 1 including a high resolution counter 10 and a circular buffer 20.

Referring now to FIG. 1 there is shown a block diagram depicting a computer system 100 including a processor 1, the processor 1 including a high resolution counter 10 and a circular buffer 20.

Figure 2:
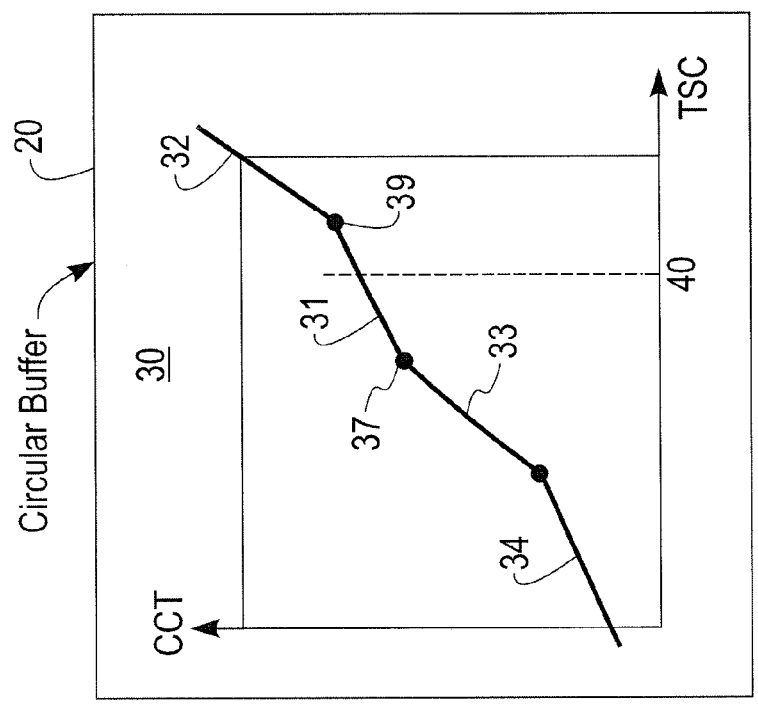
FIG. 2 is the circular buffer 20.

Referring now to FIG. 2 there is shown the circular buffer 20.

As shown, the circular buffer 20 includes a piecewise-linear mapping 30 of high-resolution counter readings to TAI (International Atomic Time) nanoseconds to thereby obtain a smooth translation of counter readings to TAI, with no jumps, and only gentle slope changes to track some external time reference, or a neighboring cluster node. Using TAI avoids Leap Second discontinuities when measuring intervals.

As shown in FIG. 2, a circular buffer 20 includes the piecewise-linear map 30. The map 30, in turn, includes a current leg 31 that is currently being used and also a future leg 32 that will be used in the future.

Also shown is the current point of time 40. Conceptually, the future leg 32 is computed while the current leg 31 is still being used.

By using a piecewise-linear mapping 30 of high-resolution counter readings to TAI (International Atomic Time) nanoseconds it is possible to obtain a smooth translation of counter readings to TAI, with no jumps, and only gentle slope (a few ppm) changes to track some external reference such as, for example, an attached GPS receiver, or an NTP; source, or a neighboring cluster node (in order to keep clock offsets between cluster nodes close to zero). This also avoids Leap Second discontinuities when measuring intervals. Note most time of day functions return Coordinated Universal Time (UTC).

An embodiment of the present invention returns both UTC and TAI, in a structure that contains the following fields:

(a) UTC seconds since 1970 corresponding to timestamp;
(b) nanoseconds in current second (0-999999999);
(c) Leap Second offset corresponding to timestamp;
(d) TAI seconds of next or last Leap Second Event (LSE) (or zero if neither LSE is known); and
(e) the raw timestamp that denotes current time (typically a 64-bit time stamp counter (TSC) or Time Base reading).

Time derived by this method is called Coordinated Cluster Time (or CCT) in what follows.

One particular advantage is that this can be used to obtain both short-term and long-term consistent interval measurements even while the mapping is being updated by an asynchronous computer program that runs in the background, or asynchronous daemon, for intervals between events that may happen on different cluster nodes (as well as locally, of course).

To avoid system calls, this mapping is recorded in a shared page, and updated by a time synchronization daemon, which can then use Pulse-Per-Second or low-latency messaging to follow an external time reference.

There are several teachings to this invention.

A first teaching of the invention is the use of a continuous piecewise-linear mapping 30. Several "legs" of this mapping can be kept in the circular buffer 20, so that finding and using the applicable segment works reliably in the presence of concurrent updates by a synchronization daemon. With reference to FIG. 2, the update is applied to the future leg 32, so the current leg 31 does not change unless the reading program is interrupted long enough for updates to wrap around, a case that is detected and leads to a retry.

Each map entry holds the counter reading and TAI_nanosecond equivalent of the starting point, and the applicable slope for that leg. An end-of-time marker (max counter value) separates the past from the future in the circular buffer, which must always contain at least one entry in the past, otherwise the map is in an uninitialized state and cannot be used.

With reference to FIG. 2, the circular buffer 20 contains four mapping entries:

A first entry 34, whose endpoint is already in the past, and hence is available for overwriting;

A second entry 33 which just expired, i.e. the current time 40 is past its endpoint 37;

A third entry which used to extend to the end of time, but was recently shortened by an update that introduced a new end point 39, still in the future; this leg 31 is the "current leg"; and A fourth entry 32, which is the newest leg created by the last update, with a newly-computed and adjusted slope. This leg 32 is the one that runs to the end of time, until the next update, that is, when it too will be split, reclaiming the current first leg 34.

Note that the order presented above is time order. The actual order in the circular buffer 20 may be a rotation thereof.

A second teaching of the invention is the use of a shared page to permit access without a system call, except possibly on first reference.

Figure 3:
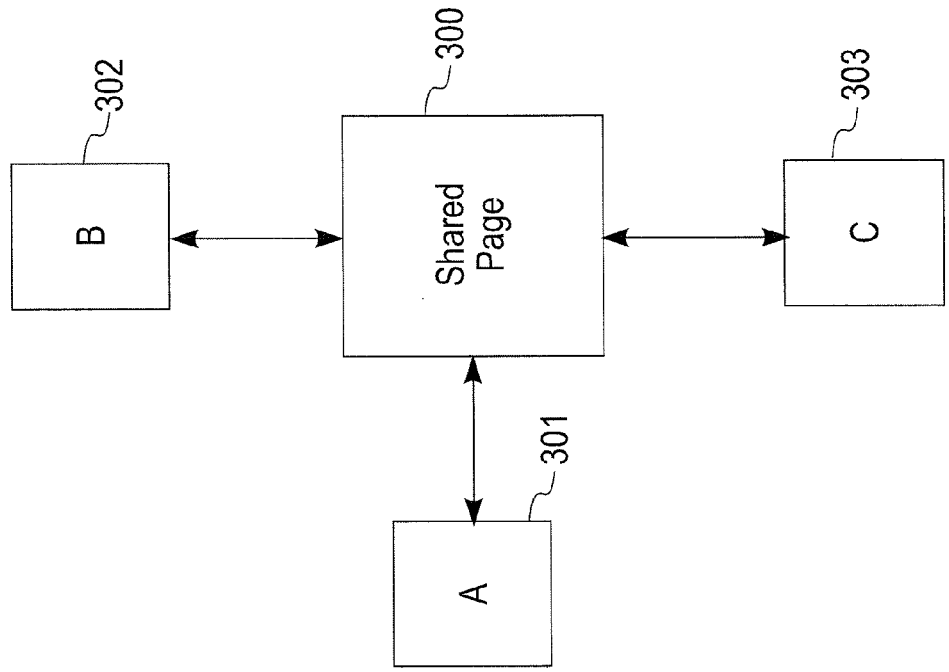
FIG. 3 is a block diagram of a shared page as accessed by multiple user processes A, B and C.

Referring now to FIG. 3, there is shown the shared page depicted by reference number 300, with representative user processes A, B, C being depicted by reference numbers 301, 302, 303, respectively.

In contrast, current implementations are inadequate in at least one respect: an update to the Linux dispatcher that records time-interpolation information in a library-accessible place, using the so-called vsyscall method. One important advantage of the inventive shared page method is that it requires no kernel changes.

A third teaching of the invention is a definition of a get_time interface that deals completely with Leap Second issues, i.e., returns both UTC and TAI in a convenient form, and permits the actual Leap Second to be recognized, if the application wants to display 23:59:60, as required by the International Organization for Standardization (ISO). The following is an exemplary structure that is passed by reference to the Read_CCT (struct CCTime) function:

(In the structures that follow, Unn and Snn stand for Unsigned Integer and Signed Integer of nn bits—actual types depend on the programming language and environment.)

```
struct CCTime
{
    U32 s;      // UTC seconds since 1970
    U32 ns;     // nanoseconds in second
    S32 lso;    // Corresponding Leap Second Offset (LSO)
    U32 nls;    // Next or last Leap Second (TAI seconds)
    U64 tb;     // 64-bit raw timebase or TSC value
};
```

To get TAI, add the leap second offset (LSO) to the seconds field. TAI is incremented regularly, but (binary) UTC repeats a positive Leap Second (or skips a negative Leap Second), so it cannot be used unchanged to measure intervals that cross a Leap Second event with the precision possible by these teachings.

The raw timebase is machine-dependent; it is read from the Time Stamp Counter (TSC) (Cycle Counter) on x86-type processors, or from the TB (Time Base) register on PowerPC processors.

The Leap Second information is also recorded in the shared page, and is mostly static; it needs to be updated only when a new Leap Second Event has been announced by the IERS (the International Earth Rotation Service), which happens every six months (announcing a new event, or declaring that no event is scheduled for the next six months). The information that is recorded consists of the current Leap Second Offset, the next LSO, and the TAI second of the next event—the "nis" field returned in the CCTime structure. The mapping computes TAI, whose "seconds" component is then compared to "nis", to pick the applicable LSO to be subtracted in order to get UTC seconds. When no Leap Second Event is planned, the applicable LSO can be the "next" one; the previous "current" having become "old" when the last Leap Second Event happened.

A fourth teaching of the invention is a synchronization mechanism based on a shared Pulse-Per-Second (PPS) source. This would be one possible embodiment, used when this hardware is available, and message communication latency has too much jitter to permit accurate offset determination.

Non-latency-critical messages are used to establish a common reference time with 100 ms resolution so as to be able to label the Pulse-Per-Second events; Network Time Protocol (NTP) can be used for this, for example. Some device driver captures high-resolution counter readings close to the received Pulse-Per-Second signal, and the Coordinated Cluster Time (CCT) update daemon can use a circular history array of Pulse-Per-Second timestamps to compute a new leg for the piecewise-linear mapping 30, for example using linear regression.

A fifth teaching of the invention is a synchronization mechanism based on low-latency timing message exchange, possibly exploiting the Almost-Peer-to-Peer method for improved fault tolerance. This mechanism uses clock filtering such as that described in "Filter turning point detection", by S. M. Carlson, M. Hack and L. Zhang, now U.S. Pat. No. 7,103,514, granted 5 Sep. 2006, which patent is hereby incorporated by reference in its entirety. The clock filtering is used to derive skew and offset from neighboring nodes, which are then used to steer individual CCT mappings (i.e., compute new legs as appropriate) to minimize the offsets between cluster nodes. According to this patent, a method and a system for detecting a filter turning point is disclosed. The method comprises the steps of providing a set of points representing measured time delays between two clocks, providing a turning indicator to measure a magnitude of turns per measurement interval, and identifying a turn at a given point when the turn indicator at the given point is above a given value. The turn indicator is given by the equation turn_indicator=(rtt_min_rti_estimate)/number_of_points, where rtt_min is the minimum round trip delay in all the measurement points, and rtt_estimate is the estimated round trip delay using the symmetric convex hull algorithm.

This mechanism is called XTP in what follows, for "eXchange Time Parameters". It would be the preferred embodiment in clusters that support stable low-latency communication, such as InfiniBand. It is applicable as long as XTP messages utilize the best communication method between nodes, in terms of low jitter and latency.

Another possible embodiment of the invention would use a sixth teaching, namely, a hardware broadcast mechanism to obtain periodic common reference timestamps, from which CCT mappings can be computed in a way that is a cross between that used by Pulse-Per-Second and by XTP.

In summary, the invention reads the current time-of-day from the up-to-date map, while maintaining this map, that is, adding new legs while discarding out-of-date legs, so as to stay up-to-date.

In this respect, up-to-date means that the starting point 37 of the latest applicable leg 31, which starting point 37 is in the past, and whose end point 39, i.e., the starting point of the next leg 32, is in the future, is not too far in the past, and that the slope is accurate, so that the time interpolation error is within the specified range of accuracy. This interpolation error is equal to the slope error times the elapsed time since the leg's starting point.

While linear interpolation by itself is not novel, it is noted that existing mechanisms use a single leg, with the starting point typically when the machine was last booted, or perhaps when a potentially disruptive adjustment was last made.

One important feature of the present invention is that updates are made for the future, i.e., when a new leg is computed, it is computed with a starting point that is still in the future, so that current concurrent readers are not affected. The transition 39 to the new leg then happens passively, as the starting point slips from the future into the past, so to speak.

The method for forming the piecewise-linear map 30 and the circular buffer 20 are now described in more detail.

The circular buffer 20 consists of a fixed number of entries, which are maintained by overwriting the oldest entry when a new entry is made during a map update. Each entry consists of a triple:

TSCval, TAIns, Slope.

The entries are in circular order based on TSCval, and at least one of them has TSCval=EOT (End of Time) mark, which is the largest possible value of the field. The EOT entry is followed (in circular order) by the oldest entry in the buffer. At least one entry has a TSCval that is older, thus has a smaller value, than the current TSC reading; otherwise the map 30 is in an unitialized state.

The method for reading the current time, in the form of TAInanoseconds (which are then converted to UTC and recorded in the CCTtime structure) are as follows:

(1) Read the current TSC (Time Stamp Counter) and remember this as TSCnow;

(2) Scan the circular buffer until an entry is found whose TSCval is less than or equal to TSCnow, but which is followed by an entry whose TSCval is strictly greater than TSCnow (or is the last entry in the circular buffer 20). Remember the TSCval used in the comparison as myTSCval. Note that this scan must succeed in at most N steps if the buffer holds N entries, and is in an initialized state. If no applicable entry has been found after N steps, report an error ("map not initialized").

(3) Pick up TAIns and Slope from the selected entry (as myTAIns and mySlope).

(4) Verify that myTSCval still matches TSCval in the selected entry; if not, go back to step (1). This can happen if the reader was interrupted, and in the meantime the update program has performed several updates, wrapping around the circular buffer. It is not likely that this would happen repeatedly.

(5) Use linear interpolation to convert TSCnow to TAInanoseconds:

$$TAInanoseconds = myTAIval + (TSCnow - myTSCval) * mySlope.$$

The map is updated as follows.

At periodic intervals—every couple of seconds perhaps (the period need not be precise or constant, though it may be)—an update daemon (an independent running program that wakes up from time to time) performs a measurement of the offset and skew between CCT as measured by the current map and some reference clock, for example, Pulse-Per-Second source or XTP message exchange. These follow from known techniques, such as AP2P and Convex Hull Filtering.

For the aforementioned AP2P technique see, for example, "Almost peer-to-peer clock synchronization", by Michel Hack, Ahmed Sobeih, Zhen Liu and Li Zhang, filed 11 Jan. 2007 in the USPTO as application Ser. No. 11/622,177, assigned to IBM Corporation.

Also, for the aforementioned Convex Hull Filtering technique see, for example, "Method and system for clock skew and offset estimation", by Scott Carlson, Michel Hack and Li Zhang, filed 9 Sep. 2005 in the USPTO as application Ser. No. 11/223,876, assigned to IBM Corporation.

From this information the update daemon determines the slope change needed to steer CCT towards the reference time. If the current slope is good enough, nothing else is done. For example, if a precision of 1 microsecond is desired, and the map is recomputed every second, a slope error of one tenth of a part per million would not warrant a map update.

Otherwise, a new slope, call it newSlope, is computed, and the last leg of the piecewise-linear map (the one that logically extends to the End-Of-Time) is logically broken at a point in the near future (say, one second ahead of the current time 40), into a finite leg with its current slope, and a new last leg (with the new slope) that runs to End-of-Time (EOT).

The update program is the only one that updates the map 30, so it can remember where the last leg is in the circular buffer, and possibly avoid a scan to find it. (Typically the circular buffer 20 is pretty short, e.g. four to eight entries, so scanning would be trivial.)

Let newTAIns be the selected point in the near future, and newSlope the desired slope for mapping TSC to TAI. Following is an exemplary process by which to add a new leg, overwriting an oldest leg in the buffer 20.

Figure 4:
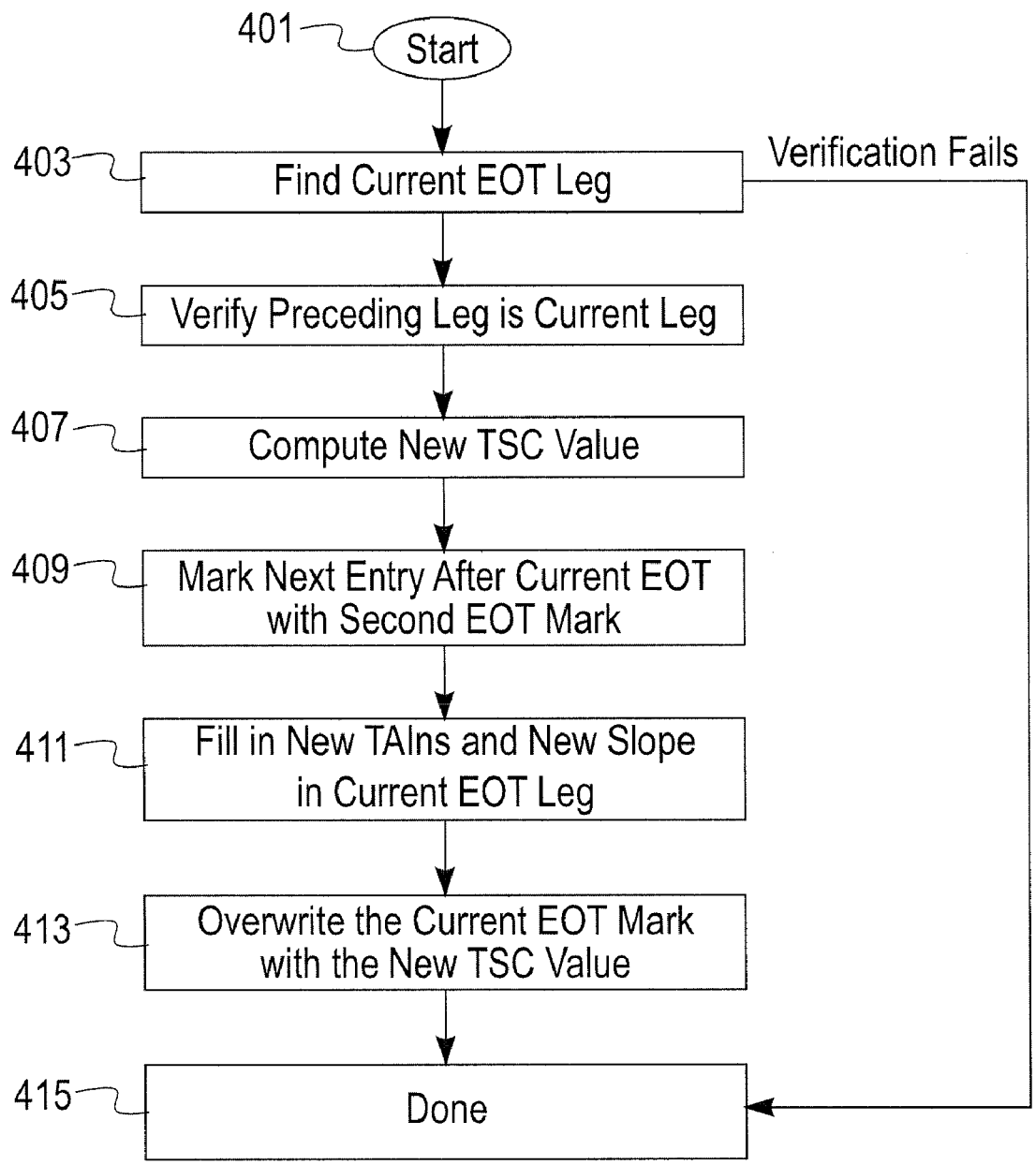
FIG. 4 shows an exemplary process by which to add a new leg, overwriting an oldest leg in the buffer 20.

The following process is depicted in the FIG. 4 flow diagram 400.

(1) In step 403, the process finds the current EOT leg in the circular map 30 (a remembered pointer may be used for this). The following entry is necessarily the oldest entry in the circular buffer.

(2) In step 405, the process verifies that the preceding leg is the current leg with respect to newTAIns, i.e. that newTAIns>TAIns for that entry. If not, the new update program ran too soon, and it should skip this update.

(3) In step 407, the process computes a newTSCval by reverse linear interpolation from newTAIns using the current leg, which current leg is identified in (2), step 405, above. No special precautions are needed since it is assumed that this is the only updater.

(4) In step 409, the process marks the next entry (after the current EOT, in circular order) with a second EOT mark, effectively overwriting the oldest entry in the map.

(5) In step 411, the process fills in newTAIns and newSlope in the current EOT leg. At this point the new information is still effectively invisible to a concurrent reader, as the EOT mark is still there.

(6) In step 413, the process overwrites the current EOT mark with the newTSCval computed in (3), step 407, above. This is what instantiates the new leg. The second EOT mark, written in (4), step 409 above, becomes the new current EOT mark, step 415.

It is noted that (4), step 409, above is necessary to make sure that a concurrent reader always finds an EOT mark when scanning the map.

It is noted that this protocol is entirely lock-free, thus avoiding the kinds of lock delays often encountered when a structure is accessed by one writer and concurrent readers. In a system with strong memory ordering no additional instructions are needed, though in a system with weak ordering it would be necessary to insert so-called memory barriers at appropriate points. This would not affect the overall nature of the protocol.

It is noted that while Leap Second handling is not directly tied to the piecewise-linear map of the present invention, it does use the same idea of using a structure whose update is restricted to the future. The map is used to derive TAI (which ticks uniformly without regard to the variations in earth rotation), and a second step then transforms TAI to UTC.

This structure consists of the following triplet:

```
struct LSinfo
{ // Leap Second Information - mostly static
S32 oldlso; // Leap Second Offset before noted Leap Second Event
U32 lsetai; // TAI second of next (or last) LSE
S32 newlso; //LSO after noted Leap Second Event
}.
```

It resides in the same shared page as the piecewise-linear map, because it is accessed at the same time by the program that returns CCT in a structure that effectively returns both UTC and TAI.

For reference, here is the CCTime structure again:

```
struct CCTime
{
    U32 s;      // UTC seconds since 1970
    U32 ns;     // nanoseconds in second
    S32 lso;    // Corresponding Leap Second Offset (LSO)
    U32 nls;    // Next or last Leap Second (TAI seconds)
    U64 tb;     // 64-bit raw timebase or TSC value
};
```

To get TAI, add the LSO to the seconds field. TAI is incremented regularly, but (binary) UTC repeats a positive Leap Second (or skips a negative Leap Second), so it cannot be used unchanged to measure intervals that cross a Leap Second event with the necessary precision.

The transformation from TAI as computed from the piecewise-linear map is as follows.

Figure 5:
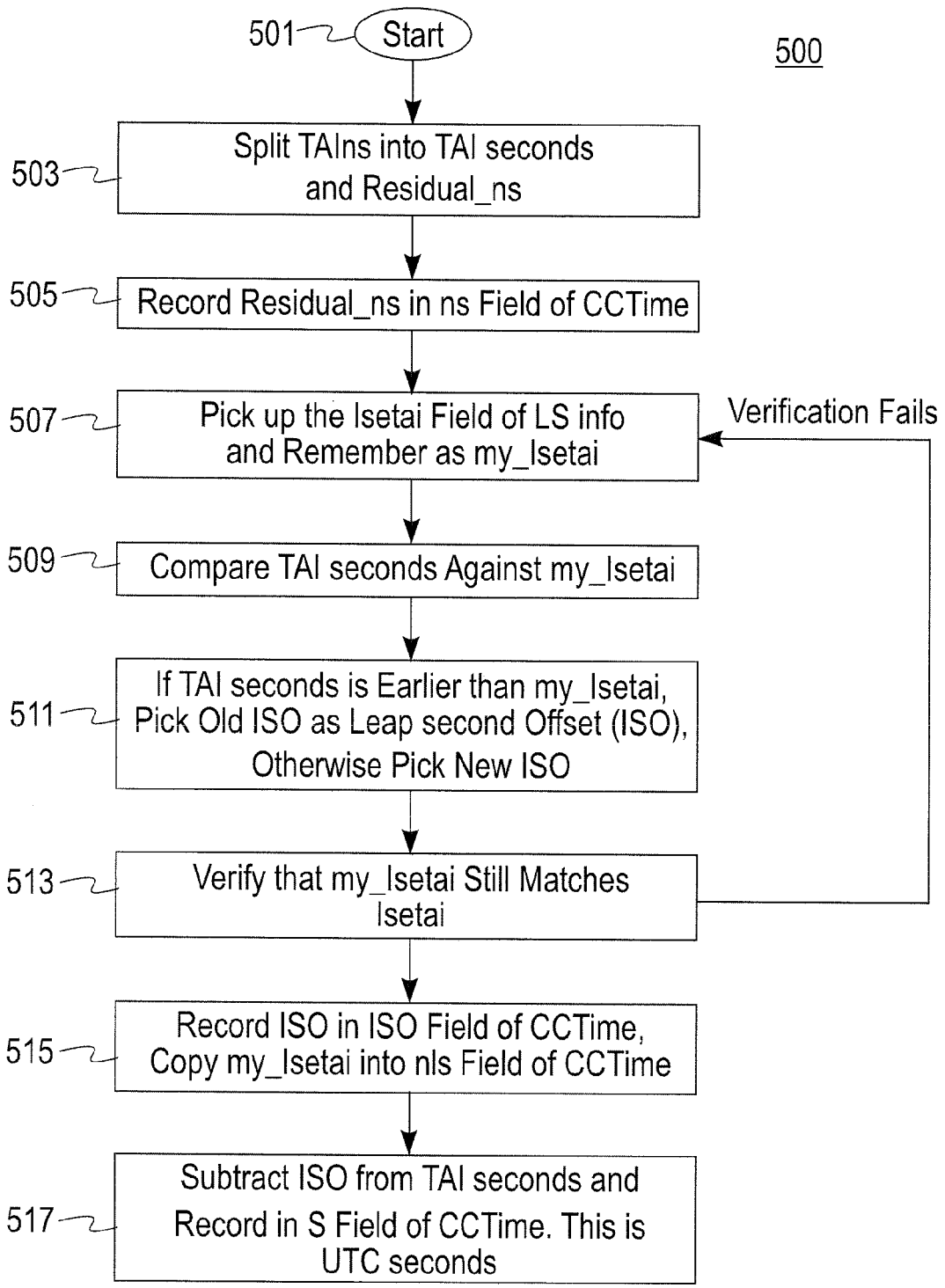
FIG. 5 shows the transformation of TAI to UTC as computed from the piecewise-linear map.

The following process is depicted in drawing FIG. 5 as flow diagram 500.

(1) In step 503, the process splits TAInanoseconds into TAIseconds and residual_nanoseconds.

(2) In step 505, the process records residual_nanoseconds in the ns field of CCTime.

(3) In step 507, the process picks up the Isetai field of LSinfo and remembers this as my_Isetai.

(4) In step 509, the process compares TAIseconds against my_Isetai.

(5) In step 511, based on the comparison in (4), step 509, above, if TAIseconds is *earlier* than my_Isetai, the process picks the old leap second offset (oldlso) as the applicable Leap Second Offset (lso), otherwise the process picks the new leap second offset (newlso) as the applicable LSO.

(6) In step 513, the process verifies that my_Isetai still matches Isetai; if not, the process goes back to step (3), flow diagram step 507. This could happen in the rare occasion where the update program happened to update LSinfo while it was being used. As those updates only happen every few months, there is no risk of an actual loop here.

(7) In step 515, the process records lso in the lso field of CCTime, and copies my_Isetai to the nls field of CCTime.

(8) In step 517, the process subtracts lso from TAIseconds and records the result in the s field of CCTime. This is UTC seconds; nanoseconds are always the same for TAI and UTC. (The tb field of CCTime would have been filled in when TAInanoseconds was derived from the map.)

The Leap Second info (LSinfo) structure is updated whenever a new Leap Second is announced, or rather, at any time between such an announcement and the day that the Leap Second actually occurs on. The IERS (International Earth Rotation Service) sends out Bulletin C at least every six months to announce the next Leap Second, or to confirm that there won't be one at the end of June or December. People and organizations can subscribe to this. It is acceptable for the LSinfo structure to have an Isetai value that is in the past, so that newlso would always be picked—that's why a value of zero (always in the past, if we are appropriately careful to avoid an epoch where wrap-at-zero could correspond to a Leap Second event) can be used for the "unknown" case. Note that with an epoch of 1970 and a U32 field for seconds the wraparound point is in the 22nd century—not an urgent concern.

One novel aspect of the above approach is that both oldlso and newlso are kept available, and the actual LSE (Leap Second Event) is used as a passive comparison field. Other systems use the concept of the "Current Leap Second Offset" which must be actively updated at the moment a Leap Second Event LSE) occurs. Systems like the IBM z/OS operating system do that, and to minimize the danger of confusion (converting an old TAI value with the new LSO, because TAI was computed just before the LSE, but the program looked up the LSO after the update) they deliberately freeze the system (stop dispatching user processes) for a whole second. Other systems may accept a higher probability of using the wrong offset. Embodiments of this invention avoid this problem entirely, and need no time-critical update process, nor does it delay reading the current time.

Now, there has been other work on trying to handle Leap Seconds properly, most notably by Markus Kuhn of the University of Cambridge. One relevant paper is "Proposed new <time.h> for ISO C 200X", created September 1998, last modified August 2004. This is an on-line paper, and its true url is http://www.cl.cam.ac.uk/~mgk25/time/c. Basically, the paper proposed two things:

First, have separate interfaces to report UTC and TAI.

Second, when reporting UTC in the form of UTCseconds and UTCnanoseconds (as in the present invention), let the nanoseconds count through 1,000,000,000 up to 1,999,999,999 during a positive Leap Second. (Normally the nanoseconds count runs up to 999,999,999 and then wraps to zero for the next full second. A negative Leap Second would simply skip one second in the UTCseconds field, as would be the case for the CCTime in the present invention.

This is an elegant solution, and simply different from the present invention. In the present invention, the nanoseconds field always wraps from 999,999,999 to zero, and during a positive Leap Second the UTCseconds field would be repeated, but the LSO field would be incremented instead. Since TAIseconds is simply UTCseconds+LSO, TAIseconds ticks normally. (During a negative Leap Second, UTCseconds would be incremented by two as LSO is decremented by one, so that again the sum would tick normally, as is appropriate for TAI.)

Thus it is seen that the foregoing description has provided by way of exemplary and non-limiting examples a full and informative description of the best apparatus and methods presently contemplated by the inventors for maintaining time in a computer system. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A computer system, comprising:
   a processor configured upon execution of a program to cause the computer system to perform the following:
   determining a current value from a counter, the current value in a raw time base;
   determining, from the current value in the raw time base and using a map, a current time in a time basis, the map providing a plurality of interconnected piecewise linear segments mapping values of the raw time base to values of the time basis, each of the piecewise linear segments defined by a plurality of entries in the map and corresponding to a time period during which a slope is predetermined to cause values of the raw time base to be steered toward a reference time;
   outputting the current time;
   causing the map to be recorded in at least one shared page of memory, where the at least one shared page allows access to the map without a system call; and
   periodically executing an update daemon that performs operations of creating and updating the map.

2. The computer system of claim 1, wherein the map includes a current segment that is currently being used and also a future segment that will be used in the future, and wherein the future segment is computed while the current segment is being used.

3. The computer system of claim 1, wherein the time basis is an international atomic time basis, and determining further comprises determining the current time in the international atomic time basis.

4. The computer system of claim 3, where processor is further configured by execution of the program to cause the computer system to perform the following: transforming the current time in the international atomic time basis into a current time in a coordinated universal time basis by using an applicable leap second offset, wherein the current time comprises one or both of the current time in the international atomic time basis or the current time in the coordinated universal time basis.

5. The computer system of claim 4, where the leap second offset is determined by comparing the current time in the international atomic time basis to a threshold, with separate before- and after-values of the leap second offset.

6. The computer system of claim 5, wherein the leap second threshold and leap second offset can be updated at any time before the leap second threshold becomes current.

7. A method, comprising:
   determining a current value from a counter, the current value in a raw time base;
   determining, from the current value in the raw time base and using a map, a current time in a time basis, the map providing a plurality of interconnected piecewise linear segments mapping values of the raw time base to values of the time basis, each of the piecewise linear segments defined by a plurality of entries in the map and corresponding to a time period during which a slope is predetermined to cause values of the raw time base to be steered toward a reference time;
   outputting the current time;
   causing the map to be recorded in at least one shared page of memory, where the at least one shared page allows access to the map without a system call; and
   periodically executing an update daemon that performs operations of creating and updating the map.

8. The method of claim 7, wherein the map is comprised in a circular buffer.

9. The method of claim 8, wherein the map includes a current segment that is currently being used and also a future segment that will be used in the future, and wherein the future segment is computed while the current segment is being used.

10. The method of claim 8 wherein a new segment is added to the map by a method comprising:
    (a) find a current end of time entry in the circular buffer;
    (b) verify that a starting point in the time basis of a current end segment having the current end of time is in the past;
    (c) compute a new segment origin in the raw time base by reverse linear interpolation from a desired new starting point in the time basis chosen after a current time-in the time basis, the interpolation also using a value in the raw time base and a value in the time basis from a starting point of the current end segment;
    (d) mark a next entry after the current end of time, in circular order, with a second end of time mark, wherein an oldest entry in the circular buffer is overwritten and wherein the current end of time entry becomes an older end of time entry and the oldest entry becomes the current end of time entry;
    (e) fill in the new starting point and a computed new slope in the older current end of time entry; and
    (f) overwrite the current end of time mark in the older end of time entry with the new segment origin, wherein the older end of time entry becomes an entry defining a beginning of a new end segment.

11. The method of claim 7, wherein the time basis is an international atomic time basis, wherein determining further comprises determining the current time in the international atomic time basis.

12. The method of claim 11, further comprising transforming the current time in the international atomic time basis into a current time in a coordinated universal time basis by using an applicable leap second offset, wherein the current time comprises one or both of the current time in the international atomic time basis or the current time in the coordinated universal time basis.

13. The method of claim 12, where the leap second offset is determined by comparing the current time in the international atomic time basis to a threshold, with separate before- and after-values of the leap second offset.

14. The method of claim 13, wherein the leap second threshold and offsets leap second offset can be updated at any time before the leap second threshold becomes current.

15. A non-transitory computer readable storage device comprising a program executable by a processor to cause a computer system to perform the following:
   determining a current value from a counter, the current value in a raw time base;
   determining, from the current value in the raw time base and using a map, a current time in a time basis, the map providing a plurality of interconnected piecewise linear segments mapping values of the raw time base to values of the time basis, each of the piecewise linear segments defined by a plurality of entries in the map and corresponding to a time period during which a slope is predetermined to cause values of the raw time base to be steered toward a reference time;
   outputting the current time;
   causing the map to be recorded in at least one shared page of memory, where the at least one shared page allows access to the map without a system call; and
   periodically executing an update daemon that performs operations of creating and updating the map.

16. The non-transitory computer readable storage device of claim 15, wherein the map is comprised in a circular buffer.

17. The non-transitory computer readable storage device of claim 16, wherein a new segment is added to the map by performing at least the following:

(a) find a current end of time entry in the circular buffer;
   (b) verify that a starting point in the time basis of a current end segment having the current end of time is in the past;
   (c) compute a new segment origin in the raw time base by reverse linear interpolation from a desired new starting point in the time basis chosen after a current time in the time basis, the interpolation also using a value in the raw time base and a value in the time basis from a starting point of the current end segment;
   (d) mark a next entry after the current end of time, in circular order, with a second end of time mark, wherein an oldest entry in the circular buffer is overwritten and wherein the current end of time entry becomes an older end of time entry and the oldest entry becomes the current end of time entry;
   (e) fill in the new starting point and a computed new slope in the older current end of time entry; and
   (f) overwrite the current end of time mark in the older end of time entry with the new segment origin, wherein the older end of time entry becomes an entry defining a beginning of a new end segment.

18. The non-transitory computer readable storage device of claim 15, wherein the map includes a current segment that is currently being used and also a future segment that will be used in the future, and wherein the future segment is computed while the current segment is being used.

19. The non-transitory computer readable storage device of claim 15, wherein the time basis is an international atomic time basis, wherein determining further comprises determining the current time in the international atomic time basis.

20. The non-transitory computer readable storage device of claim 19, further comprising transforming the current time in the international atomic time basis into a current time in a coordinated universal time basis by using an applicable leap second offset, wherein the current time comprises one or both of the current time in the international atomic time basis or the current time in the coordinated universal time basis.

* * * * *